(12) United States Patent
Tomura

(10) Patent No.: US 9,599,162 B2
(45) Date of Patent: Mar. 21, 2017

(54) SEALED ROLLING BEARING

(71) Applicant: NTN CORPORATION, Osaka (JP)

(72) Inventor: Yasunari Tomura, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/432,757

(22) PCT Filed: Oct. 1, 2013

(86) PCT No.: PCT/JP2013/076657
§ 371 (c)(1),
(2) Date: Apr. 1, 2015

(87) PCT Pub. No.: WO2014/054616
PCT Pub. Date: Apr. 10, 2014

(65) Prior Publication Data
US 2015/0300411 A1   Oct. 22, 2015

(30) Foreign Application Priority Data
Oct. 5, 2012   (JP) .................................. 2012-222795

(51) Int. Cl.
*F16C 33/76*   (2006.01)
*F16C 33/78*   (2006.01)
(Continued)

(52) U.S. Cl.
CPC ........ *F16C 33/766* (2013.01); *F16C 33/7883* (2013.01); *F16C 33/805* (2013.01); *F16J 15/3264* (2013.01); *F16C 19/06* (2013.01)

(58) Field of Classification Search
CPC ..... F16C 33/76; F16C 33/7883; F16C 33/805
See application file for complete search history.

(56) References Cited

U.S. PATENT DOCUMENTS 4,770,425 A * 9/1988 Colanzi ................ F16J 15/3264
277/353
5,242,229 A * 9/1993 McLarty ............. F16C 33/7826
384/477
(Continued)

FOREIGN PATENT DOCUMENTS

JP   2-93571   7/1990
JP   3-94425   9/1991
(Continued)

OTHER PUBLICATIONS

International Search Report issued Nov. 26, 2013 in International (PCT) Application No. PCT/JP2013/076657.
(Continued)

*Primary Examiner* — Thomas R. Hannon
(74) *Attorney, Agent, or Firm* — Wenderoth, Lind & Ponack, L.L.P.

(57) ABSTRACT

A sealed rolling bearing includes an outer race and an inner race. A cylindrical portion provided at the outer portion of a sealing member is press-fitted into each end of the outer race. A cylindrical portion provided at the inner portion of a slinger is press-fitted onto each end of the inner race. The sealing member has at its inner peripheral portion first and second radial lips which are in elastic contact with the slinger to prevent entry of foreign matter into the bearing space. The slinger has an annular portion including an axially outwardly extending, outwardly bent portion provided at its outer peripheral portion. The outwardly bent portion has an outer periphery located inwardly of the outer end of the cylindrical portion of the sealing member. A small gap is defined between the outwardly bent portion and the inner surface of the cylindrical portion as a labyrinth.

7 Claims, 3 Drawing Sheets

(51) Int. Cl.
    *F16J 15/32*    (2016.01)
    *F16C 33/80*    (2006.01)
    F16C 19/06     (2006.01)

(56)         References Cited

U.S. PATENT DOCUMENTS 8,047,721 B2 *  11/2011  Aritake ................. F16C 19/386
                                                              384/477
    8,308,370 B2 *  11/2012  Nakagawa .......... F16C 33/7853
                                                              384/478
    2010/0272382 A1 * 10/2010  Yamamoto .......... F16C 33/7813
                                                              384/486

FOREIGN PATENT DOCUMENTS

JP       2005-121164    5/2005
    JP       2006-161860    6/2006
    JP       2007-247718    9/2007
    JP       2007-292143   11/2007
    JP       2008-128378    6/2008
    JP       2010-203492    9/2010
    JP       2010-261598   11/2010
    JP       2011-117608    6/2011

OTHER PUBLICATIONS

Written Opinion of the International Searching Authority issued Nov. 26, 2013 in International (PCT) Application No. PCT/JP2013/076657 (with English translation).
Extended European Search Report Issued Dec. 2, 2015 in corresponding European Application No. 13844312.2.

* cited by examiner

SEALED ROLLING BEARING

TECHNICAL FIELD

This invention relates to a sealed rolling bearing including sealing devices which close openings at the respective ends of the bearing space defined between the outer race and the inner race of the bearing.

BACKGROUND ART

A support bearing used for an intermediate shaft through which torque is applied to a constant-velocity joint coupled to a propeller shaft or a drive shaft of a motor vehicle is mounted under the vehicle floor and used under such harsh conditions that small stones and muddy water fly. Thus, old support bearings of this type were provided with externally mounted seals to prevent entry of foreign matter.

However, externally mounted seals are less used in today's support bearings of this type for reduced weight, fuel consumption and cost, and internally mounted seals are used instead to prevent entry of foreign matter such as muddy water. Such internally mounted seals may comprise two pairs of contact seals, each pair being arranged axially parallel to each other at one end of the bearing space, thereby sealing the bearing space, as disclosed in the below-identified Patent documents 1 and 2. Other internally mounted seals comprise sealing devices each including a sealing member having a radial lip and an axial lip which are in sliding contact with a cylindrical portion and an annular portion of a slinger, respectively, thereby sealing the bearing space such that no foreign matter can enter the bearing space, as disclosed in the below-identified Patent document 3.

Patent document 1: JP Utility Model Publication 2-93571U
Patent document 2: JP Patent Publication 2011-117608A
Patent document 3: JP Patent Publication 2006-161860A The sealed rolling bearing disclosed in either of Patent documents 1 and 2 is large in width and difficult to assemble, because this bearing includes a total of four contact seals, with two of them on each side of the bearing, and these four contact seals have to be mounted in position by press fitting. It is therefore desired to provide a bearing which is smaller in size and weight and is easier to assemble.

On the other hand, the sealed rolling bearing including the sealing devices disclosed in Patent document 3 has a problem in that due to an axial play of the bearing that allow axial relative movement of the bearing parts, as well as misalignment during assembling, it is impossible to mount the axial lips with required interference, which makes it difficult to ensure sealability of the sealing devices.

SUMMARY OF THE INVENTION

An object of the present invention is to provide a sealed rolling bearing which is high in resistance to muddy water and narrow in width.

In order to achieve this object, the present invention provides a sealed rolling bearing comprising an outer race, an inner race, rolling elements through which the outer race and the inner race are supported so as to be rotatable relative to each other. The outer race and the inner race define therebetween a bearing space having two open ends. Sealing devices each sealing one of the two open ends of the bearing space, and each of the sealing devices comprises a sealing member mounted on the radially inner surface of the outer race at one end of the outer race. A slinger mounted on the radially outer surface of the inner race at one end of the inner race. For each of the sealing devices: the sealing member comprises a cylindrical portion press-fitted on the radially inner surface of the outer race at the one end of the outer race, and an annular portion inwardly extending from the inner end of the cylindrical portion, and formed with only a first radial lip and a second radial lip which extend axially outwardly from the inner peripheral portion of the annular portion. The slinger comprises a cylindrical portion press-fitted on the radially outer surface of the inner race at the one end of the inner race, and an annular portion radially outwardly extending from the outer end of the cylindrical portion of the slinger. The cylindrical portion of the slinger has an outer periphery formed with a seal slide-contact surface with which the first radial lip and the second radial lip are in elastic contact.

Since the first and second radial lips provided on the sealing member of each sealing device are in elastic contact with the cylindrical seal slide-contact surface formed on the outer periphery of the cylindrical portion of the slinger, the sealing device provides a double seal. Thus the sealing device can effectively prevent entry of foreign matter such as muddy water. Also, this bearing is narrower in width than the bearing with two seal members arranged axially parallel to each other on each side of the bearing space to seal the bearing space.

A support bearing for an intermediate shaft through which torque is applied to a constant-velocity joint usually has a bearing axial play (which allows axial movement of the bearing parts) of less than 0.3 mm at the most. Thus, for each of the sealing devices, an axial gap of 0.3 to 0.5 mm is preferably defined between the distal end of the outer one of the first and second radial lips and the inner side surface of the annular portion of the slinger such that even if the seal member and the slinger are moved relative to each other by the distance equal to the above bearing axial play, the outer one of the first and second radial lips never abuts at its distal end the inner side surface of the annular portion of the slinger. This prevents damage to the radial lip.

For each of the sealing devices, by providing the annular portion of the slinger with an inwardly bent portion, and a disk portion extending from the outer periphery of the inwardly bent portion, substantially parallel to the annular portion of the sealing member, thereby defining a labyrinth gap between the disk portion and the annular portion of the sealing member, it is possible to prevent entry of foreign matter between the opposed portions of the slinger and the seal member. Even if foreign matter should enter between the opposed portions, such foreign matter can be discharged radially outwardly under the centrifugal force generated when the slinger rotates. Thus, this arrangement prevents foreign matter from sticking to or being deposited on the seal slide-contact surface, thus deteriorating sealability.

For each of the sealing devices, by providing the annular portion of the slinger with an outwardly bent portion formed by axially outwardly bending a part of the annular portion of the slinger extending from the outer periphery of the disk portion such that a minute gap is defined between the outwardly bent portion and the inner peripheral surface of the cylindrical portion of the seal member, the rotating outwardly bent portion can throws off flying foreign matter such as muddy water. The minute gap, as a labyrinth, further effectively prevents entry of foreign matter into the interior of the sealing device.

For each of the sealing devices, by inclining the outwardly bent portion obliquely outwardly, even if foreign matter should enter the interior of the sealing device, it will be thrown radially outwardly under the centrifugal force due to rotation of the slinger, while being guided along the outwardly bent portion, and thus will be effectively discharged from the sealing device.

By arranging this outwardly bent portion such that its outer periphery is located axially inwardly of the end of the cylindrical portion of the seal member, any muddy water that may drip from the upper portion of the outer periphery of the cylindrical portion at its outer end never falls into the sealing device.

For improved durability against corrosion, the slinger is preferably formed of a stainless steel plate or a molten zinc-plated steel plate. Each of the first radial lip and the second radial lip is preferably made of a synthetic rubber that is high in wear resistance, such as nitrile rubber, acrylic rubber and fluororubber.

According to the present invention, for each of the sealing devices, since the first radial lips and the second radial lips of the sealing member are in elastic contact with the cylindrical seal slide-contact surface formed on the outer periphery of the cylindrical portion of the slinger, providing a double seal, it is possible to effectively prevent entry of foreign matter such as muddy water, while minimizing the width of the bearing.

DETAILED DESCRIPTION OF THE INVENTION

Figure 1:
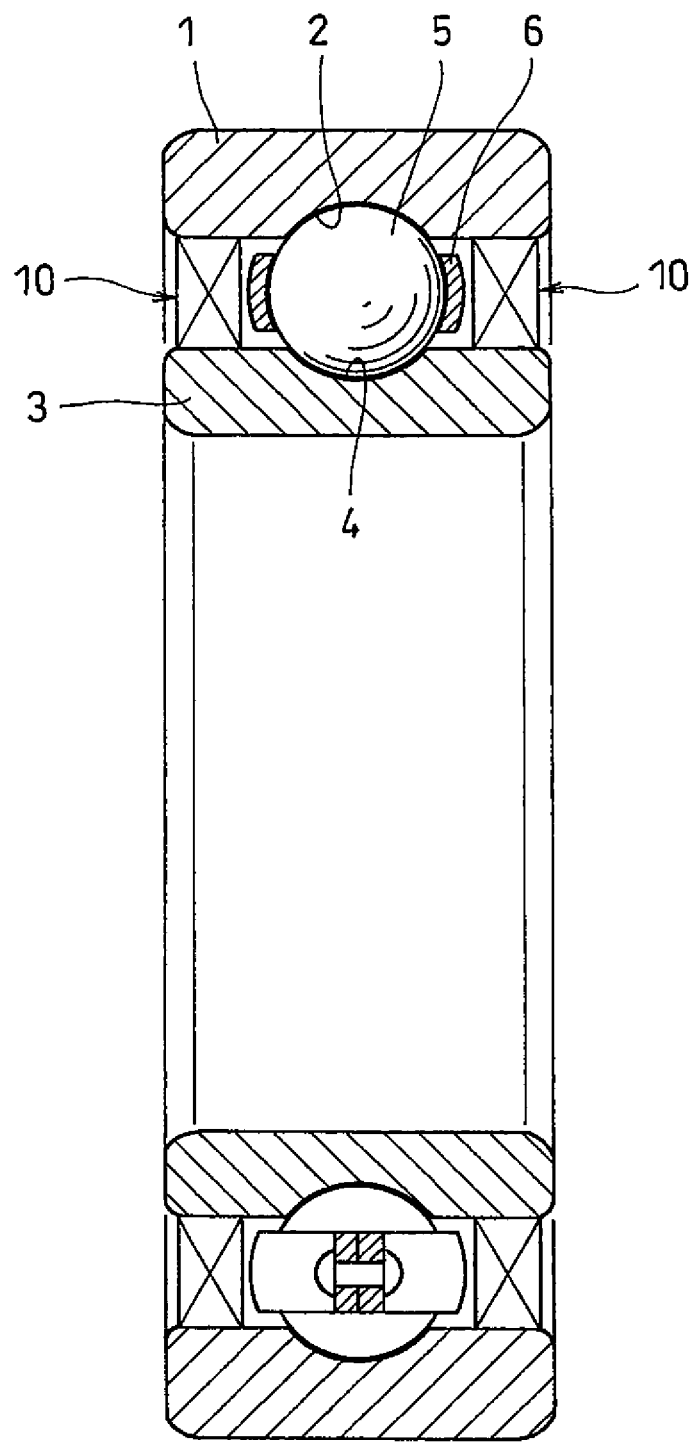
FIG. 1 is a sectional view of a sealed rolling bearing embodying the present invention.

Now an embodiment of the present invention is described with reference to the drawings. As shown in FIG. 1, the rolling bearing of the embodiment includes an outer race 1 formed with a ball groove 2 in its radially inner surface, and an inner race 3 mounted inside the outer race 1 and formed with a ball groove 4 formed in the radially outer surface thereof. The rolling bearing further includes balls 5, as rolling elements, mounted between the ball groove 2 of the outer race 1 and the ball groove 4 of the inner race 3, and retained by a retainer 6.

Figure 2:
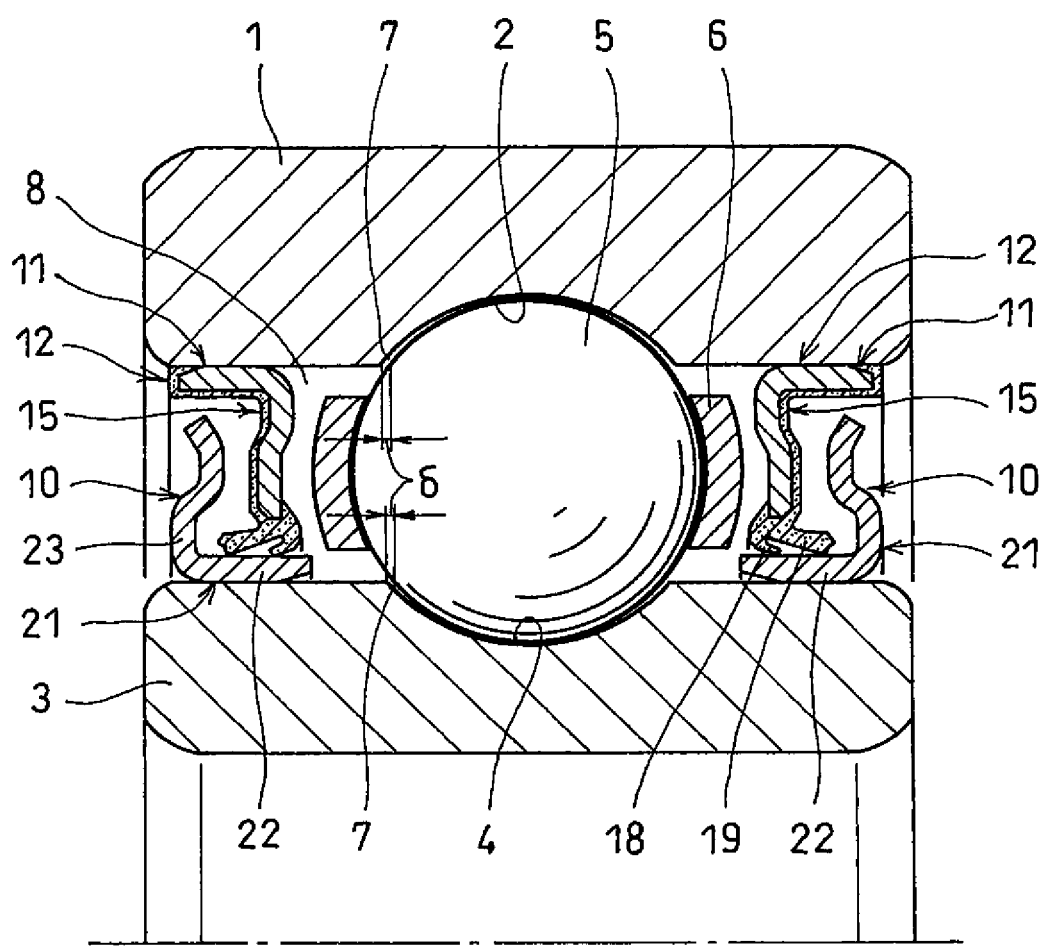
FIG. 2 is an enlarged sectional view of a portion of FIG. 1.

As shown in FIG. 2, the ball groove 2 of the outer race 1 and the ball groove 4 of the inner race 3 have radii of curvature larger than the radii of the balls 5 such that axial gaps 7 form between each ball 5 and the respective ball grooves 2 and 4. The axial gaps 7 allow relative axial movement between the outer race 1 and the inner race 3 by a distance δ, which is usually less than 0.3 mm if the bearing is a support bearing supporting an intermediate shaft.

A sealing device 10 is mounted in each of the opposite ends of the bearing space 8 defined between the outer race 1 and the inner race 3. The sealing devices 10 hermetically close the respective open ends of the bearing space 8, thereby preventing leakage of a lubricant, such as grease, sealed in the bearing space 8, and also preventing entry of foreign matter such as muddy water, into the bearing space 8. The sealing devices 10 each comprise a sealing member 11 and a slinger 21.

Figure 3:
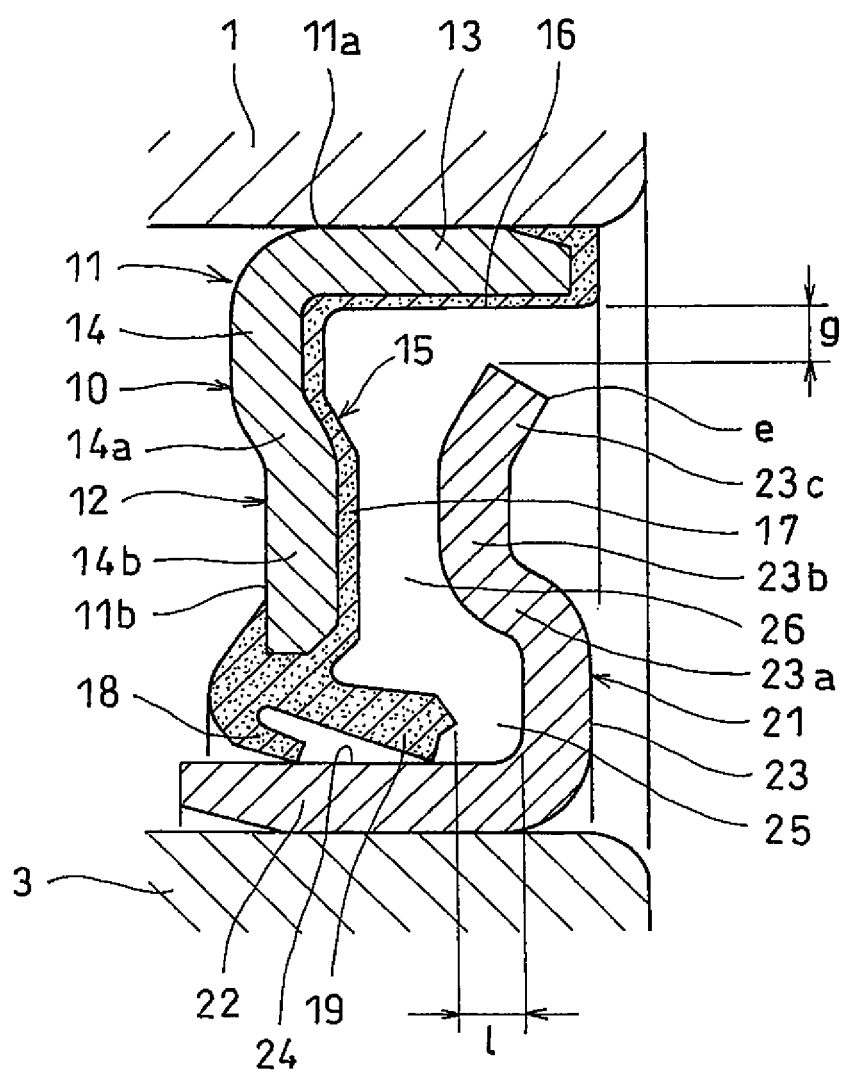
FIG. 3 is an enlarged sectional view of a sealing device shown in FIG. 2.

As shown in FIG. 3, the sealing member 11 comprises a metal core 12 and a seal body 15 fixed to the metal core 12. The metal core 12 is formed by pressing a metal sheet, and includes a cylindrical portion 13 press-fitted on the radially inner surface of the outer race 1 at one end thereof, and an annular portion 14 inwardly extending from the inner end of the cylindrical portion 13. The annular portion 14 has an inwardly inclined section 14a formed by axially outwardly bending the radially central portion of the annular portion 14. The annular portion 14 further includes a disk section 14b extending radially inwardly from the radially inner edge of the inclined section 14a.

The seal body 15 is formed of a synthetic rubber, and includes a cylindrical portion 16 covering the inner peripheral surface and the end surface of the cylindrical portion 13 of the metal core 12, and an annular portion 17 covering the outer side surface of the annular portion 14 of the metal core 12. The annular portion 17 is formed on its inner peripheral portion with only (exactly) two radial lips, namely, axially extending first and second radial lips 18 and 19 which are axially spaced apart from each other.

The synthetic rubber forming the seal body 15 is a wear-resistant and heat-resistant rubber such as nitrile rubber, acrylic rubber or fluororubber.

The cylindrical portion 13 of the metal core 12 and the cylindrical portion 16 of the seal body 15 form a cylindrical portion 11a of the sealing member 11, while the annular portion 14 of the metal core 12 and the annular portion 17 of the seal body 15 form an annular portion 11b of the sealing member 11.

The slinger 21 of each sealing device 10 is formed by pressing a metal sheet, and includes a cylindrical portion 22 press-fitted on the radially outer surface of the inner race 3 at one end thereof, and an annular portion 23 extending outwardly from the outer end of the cylindrical portion 22. The cylindrical portion 22 has an outer periphery as a seal slide-contact surface 24 with which the first and second radial lips 18 and 19 of the sealing member are in elastic contact.

The metal sheet forming the slinger 21 of the embodiment is a stainless steel, but the slinger of the present invention may be made of any other wear-resistant metal sheet such as a molten zinc-plated steel sheet.

For each of the sealing devices, an axial gap 25 is defined between the inner side surface of annular portion 23 of the slinger 21 and the second radial lip 19 of the sealing member 11. The axial gap 25 has a dimension 1 which is larger than the maximum distance by which the outer race 1 and the inner race 3 can move in the axial direction relative to each other, whereby the tip of the second radial lip 19 never abuts inner side surface of the annular portion 23 of the slinger 21 when the sealing member 11 and the slinger 21 moves in the axial direction relative to each other.

Also taking into consideration the fact that the larger the axial gap 25, the larger the width of the bearing, the axial gap 25 is set within the range of 0.3 to 0.5 mm in the embodiment.

The annular portion 23 of the slinger 21 has an inwardly inclined, inwardly bent portion 23a formed by axially inwardly bending the part of the annular portion 23 facing the inner peripheral part of the annular portion 14 of the metal core 12. The annular portion 23 of the slinger 21 further includes a disk portion 23b extending from the outer periphery of the inwardly bent portion 23a, substantially parallel to the annular portion 11b of the sealing member 11, thus defining a labyrinth gap 26 between the disk portion 23b and the annular portion 11b of the sealing member 11.

The annular portion 23 of the slinger 21 further includes an outwardly bent portion 23c formed by axially outwardly bending the part of the annular portion 23 extending from the outer periphery of the disk portion 23b so as to extend obliquely outward. The outer peripheral surface of the outwardly bent portion 23c has an outer edge e located axially inwardly of the outer end of the cylindrical portion 11a of the sealing member 11. A minute gap g is defined between the outer peripheral surface of the outwardly bent portion 23c and the inner peripheral surface of the cylindrical portion 11a of the sealing member 11.

As described above, for each of the sealing devices 10 mounted in the bearing space of the rolling bearing of the embodiment, the cylindrical portion 11a of the sealing member 11 is press-fitted on the radially inner surface of the outer race 1 at one end thereof; the cylindrical portion 22 of the slinger 21 is press-fitted on the radially outer surface of the inner race 3 at one end thereof. The first and second radial lips 18 and 19 provided on the inner peripheral portion of the sealing member 11 are in elastic contact with the cylindrical seal slide-contact surface 24 formed on the outer periphery of the cylindrical portion 22 of the slinger 21, thereby providing a double seal. This arrangement effectively prevents entry of foreign matter such as muddy water into the bearing, and also makes it possible to reduce the width of the bearing, compared to a conventional arrangement in which two sealing members are arranged in parallel to each other at each end of the bearing space 8 to seal the bearing space 8.

The annular portion 23 of the slinger 21 is provided with the inwardly bent portion 23a, the disk portion 23b extending from the outer periphery of the inwardly bent portion 23a, substantially parallel to the annular portion 11b of the sealing member 11, thereby defining the labyrinth gap 26 between the disk portion 23b and the annular portion 11b, and the outwardly bent portion 23c formed by axially outwardly bending the part of the annular portion 23 extending from the outer periphery of the disk portion 23b to define a minute gap g between the outwardly bent portion 23c and the inner peripheral surface of the cylindrical portion 11a of the sealing member 11, if the bearing is of the inner race rotating type, when the slinger 21 rotates together with the inner race 3, the rotating outwardly bent portion 23c throws off flying foreign matter such as muddy water. The minute gap g, as a labyrinth, further effectively prevents entry of foreign matter into the interior of the sealing device 10.

Also, even if foreign matter should enter the interior of the sealing device 10, it will be thrown radially outwardly under the centrifugal force due to rotation of the slinger 21, while being guided along the outwardly bent portion 23c, and thus will be effectively discharged from the sealing device 10. As a result, it is possible to prevent adhesion or deposition of foreign matter on the seal slide-contact surface 24 formed on the outer periphery of the cylindrical portion 22 of the slinger 21, and thus to ensure high sealability.

In the embodiment, since the outer peripheral edge of the outwardly bent portion 23c of the slinger 21 is located axially inwardly of the outer end of the cylindrical portion 11a of the sealing member 11, any muddy water that may drip from the upper portion of the outer periphery of the cylindrical portion 11a at its outer end never falls into the minute gap g. This further reliably prevents entry of muddy water into the sealing device 10.

DESCRIPTION OF THE NUMERALS

1. Outer race
3. Inner race
5. Ball (rolling element)
8. Bearing space
10. Sealing device
11. Sealing member
11a. Cylindrical portion
11b. Annular portion
18. First radial lip
19. Second radial lip
21. Slinger
22. Cylindrical portion
23. Annular portion
23a. Inwardly bent portion
23b. Disk portion
23c. Outwardly bent portion

What is claimed is:

1. A sealed rolling bearing comprising:
    an outer race;
    an inner race;
    rolling elements through which the outer race and the inner race are supported so as to be rotatable relative to each other, wherein the outer race and the inner race define therebetween a bearing space having two open ends; and
    sealing devices each sealing a respective one of the two open ends of the bearing space,
    wherein each of the sealing devices comprises:
        a sealing member mounted on a radially inner surface of the outer race at a first end of the outer race; and
        a slinger mounted on a radially outer surface of the inner race at a first end of the inner race; and
    wherein the sealing member of each of the sealing devices comprises a metal core and a rubber seal body, each sealing member being configured to have:
        a cylindrical portion press-fitted on the radially inner surface of the outer race at the first end of the outer race, a cylindrical portion of the metal core having a cylindrical portion of the rubber seal body on a radially inner surface thereof; and
        an annular portion radially inwardly extending from an axially inner end of the cylindrical portion, an annular portion of the metal core having an annular portion of the rubber seal body on an axially outer surface thereof, the annular portion having exactly two lips consisting of a first radial lip and a second radial lip, both of said first radial lip and the second radial lip extending axially outwardly from an inner peripheral portion of the annular portion so as to be axially spaced apart from each other;
    wherein the slinger of each of the sealing devices comprises:
        a cylindrical portion press-fitted on the radially outer surface of the inner race at the first end of the inner race, and
        an annular portion radially outwardly extending from an outer end of the cylindrical portion of the slinger;
    wherein the cylindrical portion of the slinger has an outer periphery formed with a cylindrical seal slide-contact surface with which the first radial lip and the second radial lip are in elastic contact; and
    wherein the sealing devices are configured such that the annular portion of the rubber seal body of the sealing member of each respective one of the sealing devices faces and does not contact the annular portion of the corresponding slinger of the respective one of the sealing devices.

2. The sealed rolling bearing of claim 1, wherein for each of the sealing devices, the second radial lip is located axially outwardly of the first radial lip, and wherein an axial gap of 0.3 mm to 0.5 mm is defined between a distal end of the second radial lip and an inner side surface of the annular portion of the slinger.

3. The sealed rolling bearing of claim 1, wherein for each of the sealing devices, the annular portion of the slinger comprises an inwardly bent portion, and a disk portion extending from an outer periphery of the inwardly bent portion, substantially parallel to the annular portion of the sealing member, thereby defining a labyrinth gap between the disk portion and the annular portion of the sealing member.

4. The sealed rolling bearing of claim 3, wherein for each of the sealing devices, the annular portion of the slinger further comprises an outwardly bent portion formed of an axially outwardly-bent portion of the annular portion of the slinger extending from an outer periphery of the disk portion such that a minute gap is defined between the outwardly bent portion and an inner peripheral surface of the cylindrical portion of the seal member.

5. The sealed rolling bearing of claim 4, wherein for each of the sealing devices, the outwardly bent portion is inclined obliquely outwardly, and has an outer periphery which is located axially inwardly of an outer end of the cylindrical portion of the seal member.

6. The sealed rolling bearing of claim 1, wherein the slinger is formed of a stainless steel plate or a molten zinc-plated steel plate.

7. The sealed rolling bearing of claim 1, wherein each of the first radial lip and the second radial lip is made of one of nitrile rubber, acrylic rubber and fluororubber.

* * * * *